(12) United States Patent
Yau

(10) Patent No.: US 10,625,878 B2
(45) Date of Patent: Apr. 21, 2020

(54) CAMERA MOUNTING APPARATUS FOR AIRBORNE OBLIQUE PHOTOGRAMMETRIC SYSTEM

(71) Applicant: Chi Pang Yau, Hong Kong (CN)

(72) Inventor: Chi Pang Yau, Hong Kong (CN)

( * ) Notice: Subject to any disclaimer, the term of this patent is extended or adjusted under 35 U.S.C. 154(b) by 0 days.

(21) Appl. No.: 16/095,382

(22) PCT Filed: Nov. 22, 2017

(86) PCT No.: PCT/CN2017/112387
§ 371 (c)(1),
(2) Date: Oct. 22, 2018

(87) PCT Pub. No.: WO2018/095335
PCT Pub. Date: May 31, 2018

(65) Prior Publication Data
US 2019/0127084 A1    May 2, 2019

(30) Foreign Application Priority Data

Nov. 23, 2016    (HK) ............................ 201611046864

(51) Int. Cl.
*B64D 47/08*    (2006.01)
*G03B 15/00*    (2006.01)
(Continued)

(52) U.S. Cl.
CPC .......... *B64D 47/08* (2013.01); *G03B 15/006* (2013.01); *G03B 17/561* (2013.01);
(Continued)

(58) Field of Classification Search
None
See application file for complete search history.

(56) References Cited

U.S. PATENT DOCUMENTS 2,210,454 A * 8/1940 Maxwell .............. G03B 17/561
                                                352/243
3,603,545 A * 9/1971 Boniface ................ F16M 11/10
                                                248/184.1
(Continued)

FOREIGN PATENT DOCUMENTS

CN    202029768 U    11/2011
CN    102980011 A    3/2013
(Continued)

*Primary Examiner* — William B Perkey
(74) *Attorney, Agent, or Firm* — George G. Wang; Bei & Ocean

(57) ABSTRACT

The present disclosure provides a camera mounting apparatus for an airborne oblique photogrammetric system that is simple in structure, scalable in the number of capturing cameras, and adjustable in tilt angle. The camera mounting apparatus includes: at least one oblique hanger plate for mounting an oblique camera, a parallel hanger plate securely connected to an aircraft chassis, and a tilt angle adjusting assembly for connecting the oblique hanger plate to the parallel hanger plate in an angle-adjustable manner. The tilt angle adjusting assembly further includes a first fixed bearing secured to the parallel hanger plate, a second fixed bearing secured to the oblique hanger plate opposite to the first fixed bearing, a hinged bearing hinging the oblique hanger plate to the parallel hanger plate, and an angle adjusting sheet connected between the first fixed bearing and the second fixed bearing.

10 Claims, 7 Drawing Sheets

(51) Int. Cl.
　　　*G03B 17/56* (2006.01)
　　　*H04N 5/225* (2006.01)
　　　*F16M 11/14* (2006.01)

(52) U.S. Cl.
　　　CPC ......... *H04N 5/2251* (2013.01); *H04N 5/2252* (2013.01); *F16M 11/14* (2013.01)

(56) References Cited

U.S. PATENT DOCUMENTS

| | | | | |
|---|---|---|---|---|
| 4,301,955 | A * | 11/1981 | DeFever | B60R 11/04 224/401 |
| 4,615,597 | A * | 10/1986 | Burriss | B60R 11/04 248/183.1 |
| 4,752,791 | A * | 6/1988 | Allred | G03B 15/006 348/144 |
| 6,315,180 | B1 * | 11/2001 | Watkins | B60R 11/04 224/275 |
| 2010/0187783 | A1 * | 7/2010 | Rosen | B66F 11/048 280/47.11 |
| 2012/0251092 | A1 * | 10/2012 | Zwaan | B64C 39/024 396/428 |
| 2015/0184792 | A1 * | 7/2015 | Maier | F16M 11/125 248/371 |
| 2016/0097966 | A1 * | 4/2016 | Song | G03B 35/08 396/428 |
| 2016/0198088 | A1 * | 7/2016 | Wang | H04N 5/23238 348/36 |
| 2019/0127084 | A1 * | 5/2019 | Yau | H04N 5/2251 |
| 2019/0185182 | A1 * | 6/2019 | Bei | F16M 11/18 |

FOREIGN PATENT DOCUMENTS

| | | |
|---|---|---|
| CN | 204956943 U | 1/2016 |
| CN | 205633087 U | 10/2016 |
| CN | 206466184 U | 9/2017 |

* cited by examiner

US 10,625,878 B2

CAMERA MOUNTING APPARATUS FOR AIRBORNE OBLIQUE PHOTOGRAMMETRIC SYSTEM

CROSS REFERENCE OF RELATED APPLICATION

This application is a continuation of International Application No. PCT/CN2017/112387 with a filing date of Nov. 22, 2017, designating the United States, now pending, and further claims to Chinese Application No. 201611046864.2 with a filing date of Nov. 23, 2016. The content of the aforementioned applications, including any intervening amendments thereto, are incorporated herein by reference.

TECHNICAL FIELD

The present disclosure relates to the field of oblique photogrammetry, and more particularly relates to a camera mounting apparatus for an airborne oblique photogrammetric system.

BACKGROUND

With expedite development of information technologies, two-dimensional fundamental geometric information data can hardly satisfy the requirements of urban information construction, and three-dimensional digital city models have become an important orientation for studies of urban geographical information systems. At present, to build a three-dimensional digital city model, the geometric modeling dominantly adopts an oblique photogrammetric technology to address issues such as lack of universality of the data of vertical orthoimages with satellite images and ground measurement equipment, and complex post-processing of data. Oblique photogrammetry is a technology of capturing images simultaneously from different angles such as vertical and oblique by a plurality of airborne cameras so to obtain more complete and accurate information of ground objects. Compared with traditional manual modeling, a three-dimensional model generated thereby has a shorter modeling period, a lower cost, and a higher accuracy. The three-dimensional modeling of oblique photogrammetry may quickly recover the real scene, which is undoubtedly advantageous over the traditional vertical aerial photography; it not only effectively makes up for the shortfalls of traditional orthoimages, but also may enhance data access efficiency of the quick three-dimensional modeling technology. Currently, oblique photogrammetry is still carried out by a large aircraft, which obviously has disadvantages such as bulkiness and inflexibility. An airborne photogrammetric system is a more ideal and easily popularized oblique photogrammetry approach due to its characteristics such as low altitude, convenience, flexibility, and high image resolution.

The airborne oblique photogrammetry technology has the following characteristics: 1) reflecting real conditions surrounding a ground object: compared with vertical orthoimages, oblique images enable a user to view the ground object from multiple angles, which reflects the actual conditions of the ground object in a more realistic way and significantly makes up for the deficiencies of vertical orthoimage-based applications; 2) capability of realizing single image measurement: with application of support software, the oblique images may be directly applied to measure height, length, area, angle, and slope, etc., which expands industrial applications of the oblique photogrammetry technology; 3) capability of acquiring profile textures of buildings: for various kinds of three-dimensional digital city applications, the city three-dimensional modeling costs may be effectively reduced by leveraging the characteristics of large-scale imaging of aerial photography in addition to extracting and pasting textures in batch from the oblique images; 4) small data amount easing network release: compared with the bulky three-dimensional data of the three-dimensional GIS technology, the data amount of the images acquired using the oblique photogrammetry technology is far less, and the image data format may be quickly released to the network using a mature technology to realize sharing and application.

A traditional airborne oblique photogrammetry shoots a ground object in various angles through 5 cameras arranged according to certain mount angles to thereby obtain true three-dimensional image data of the ground object; in the current unmanned aircraft market, the lightest 5-piece cameras is above 5 kg; for a mini unmanned aircraft with a maximum takeoff weight of only 20-30 kg, the cameras are too heavy, bulky and costly, which adds the difficulty to application. Therefore, it is desired that the unmanned aircraft is capable of carrying different number of capturing cameras in different application scenarios. In other words, the number of oblique photogrammetric cameras carried by a camera hanger of the unmanned aircraft is scalable as needed. Additionally, at different flight heights, the optimum oblique photogrammetric angles required by the oblique cameras carried by the unmanned aircraft are also different; therefore, it is desired that a camera hanger on the unmanned aircraft is enabled for appropriate adjustment of capturing angles of the oblique cameras. Further, not only the firmness of connecting the cameras to the chassis of the unmanned aircraft is considered, vibrations caused to the unmanned aircraft due to factors such as air current during flight of the unmanned aircraft should also be considered. Therefore, it becomes an imminent problem currently to solve how to build a camera mounting apparatus for airborne oblique photogrammetry use, which is simple and light-weighted, scalable with respect to the number of cameras, adjustable with respect to tilt angles of oblique cameras, and capable of mounting the cameras securely.

SUMMARY

An object of the present disclosure is to provide a camera mounting apparatus for airborne oblique photogrammetry, which is simple in structure, scalable in the number of photographic cameras, adjustable in tilt angles, reliable in connection, and effective in damping vibrations, to solve various problems existing in the prior art.

To achieve the object above, the technical solution of the present disclosure discloses a camera mounting apparatus for an oblique photogrammetric system, including: at least one oblique hanger plate for mounting an oblique camera, a parallel hanger plate securely connected to an aircraft chassis, and a tilt angle adjusting assembly for connecting the oblique hanger plate to the parallel hanger plate in an angle-adjustable manner, where the tilt angle adjusting assembly further includes a first fixed bearing secured to the parallel hanger plate, a second fixed bearing secured to the oblique hanger plate opposite to the first fixed bearing, a hinged bearing hinging the oblique hanger plate to the parallel hanger plate, and an angle adjusting sheet connected between the first fixed bearing and the second fixed bearing.

Preferably, in the camera mounting apparatus for the oblique photogrammetric system provided according to the technical solution of the present disclosure, one end of the angle adjusting sheet is a holed end and the other end thereof is a grooved end, the holed end and the grooved end of the angle adjusting sheet are connected to free ends of the first fixed bearing and the second fixed bearing through screws, respectively.

Preferably, in the camera mounting apparatus for the oblique photogrammetric system provided according to the technical solution of the present disclosure, the parallel hanger plate includes an upper parallel hanger plate and a lower parallel hanger plate, the upper parallel plate and the lower parallel plate are connected together in parallel by a plurality of gimbal damping balls, the upper parallel hanger plate is securely connected to the aircraft chassis, the lower parallel hanger plate is confifured for mounting a nadir-looking camera, where a plurality of round holes for mounting the plurality of gimbal damping balls are provided in pairs on the upper parallel hanger plate and the lower parallel hanger plate, and rectangular grooves for mounting the first fixed bearing, the second fixed bearing, and the hinged bearing are correspondingly provided on the lower parallel hanger plate and the oblique hanger plate.

Preferably, in the camera mounting apparatus for the oblique photogrammetric system provided according to the technical solution of the present disclosure, a connection position of the oblique hanger plate relative to the lower parallel hanger plate may be adjusted along the rectangular grooves.

Preferably, in the camera mounting apparatus for the oblique photogrammetric system provided according to the technical solution of the present disclosure, the oblique camera and the nadir-looking camera are securely snap-fitted to the oblique hanger plate and the lower parallel hanger plate through self-equipped spring buckle devices, and camera bonding straps as secondary camera fixations are also bonded to the lower parallel hanger plate and the oblique hanger plate, and each of the camera bonding straps is a Hook & Loop.

Preferably, in the camera mounting apparatus for the oblique photogrammetric system provided according to the technical solution of the present disclosure, the upper parallel hanger plate, the lower parallel hanger plate, the oblique hanger plate, and the angle adjusting sheet are made of carbon fiber materials, and the first fixed bearing, the second fixed bearing, and the hinged bearing are made of aluminum.

Preferably, in the camera mounting apparatus for the oblique photogrammetric system provided according to the technical solution of the present disclosure, the tilt angle adjusting assembly is provided in two sets along width directions of the oblique hanger plate and the lower parallel hanger plate.

Preferably, in the camera mounting apparatus for the oblique photogrammetric system provided according to the technical solution of the present disclosure, the tilt angle adjusting assembly adjusts an included angle between an optical axis of the oblique camera and an optical axis of the nadir-looking camera within a range from 20° to 45°.

Preferably, in the camera mounting apparatus for the oblique photogrammetric system provided according to the technical solution of the present disclosure, a reinforcing plate for fastening a relatively large camera is integrally provided on the oblique hanger plate and/or the lower parallel hanger plate, and the reinforcing plate fastens the relatively large camera through screws.

Another technical solution of the present disclosure discloses an airborne oblique photogrammetric system for an aircraft, including: the camera mounting apparatus for the oblique photogrammetric system according to any item of the technical solution above, the aircraft is a multi-rotor unmanned aircraft.

The features, technical effects, and other advantages of the present disclosure will become apparent through further illustration below with reference to the accompanying drawings.

BRIEF DESCRIPTION OF THE DRAWINGS

Hereinafter, the present disclosure will be described by embodiments with reference to the accompanying drawings. The drawings are as follows.

Figure 1:
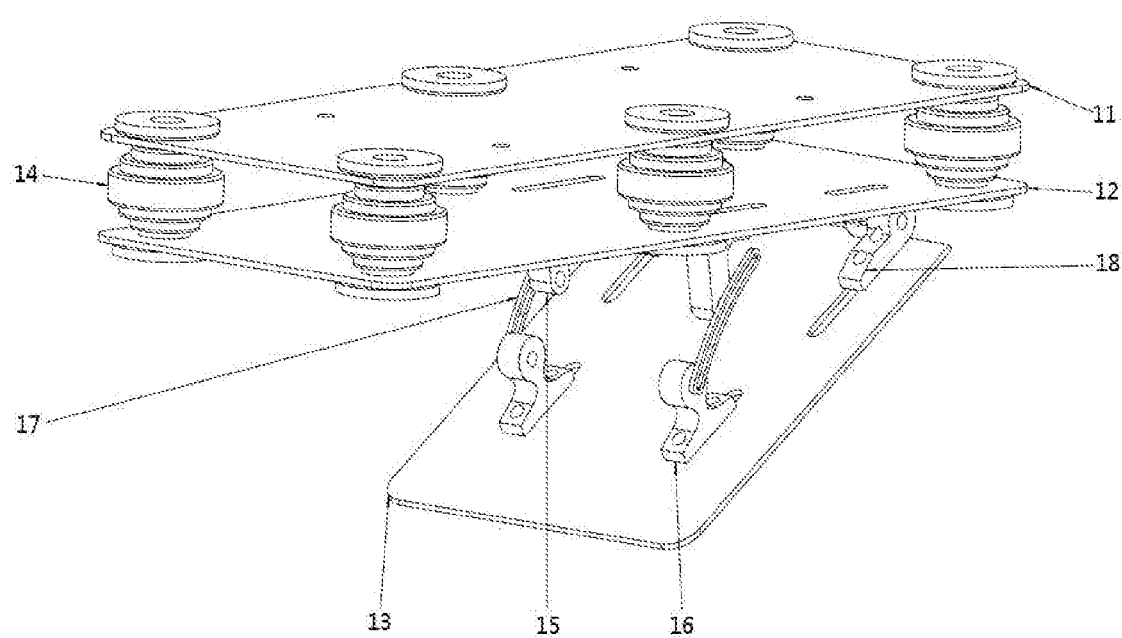
FIG. 1 is an overall structural schematic diagram of a camera mounting apparatus for mounting one nadir-looking camera and one oblique camera according to the first embodiment of the present disclosure.

The reference numerals are as follows: 11. upper parallel hanger plate 11; 12. lower parallel hanger plate; 13. oblique hanger plate; 14. gimbal damping ball; 15. first fixed bearing; 16. second fixed bearing; 18. hinged fixed bearing; 17. angle adjusting sheet; A. self-equipped spring buckle device; B1. camera bonding strap; B2. camera bonding strap; C. side reinforcing plate.

DETAILED DESCRIPTION

Hereinafter, the technical solution of the present disclosure will be described in a clear and complete manner with reference to the accompanying drawings; it is apparent that the embodiments described herein are part of the embodiments of the present disclosure, not all of them. All other embodiments obtained by those skilled in the art without exercise of inventive work based on the examples in the embodiments all fall within the protection scope of the present disclosure.

In the description of the present disclosure, it needs to be understood that the oriental or positional relationships indicated by the terms "front/back," "upper/lower," "left/right," and "inner/outer," etc. are indications oriental and positional relationships based on the drawings, which are intended only for facilitating or simplifying description of the present disclosure, not for indicating or implying that the devices or elements have to possess those specific orientations and have to be configured and operated with those specific orientations; therefore, they should not be understood as limitations to the present disclosure. Besides, the terms "first" and "second" are only used for description purposes, which shall not be understood as indicating or implying an importance.

In the present disclosure, unless otherwise explicitly provided and limited, the terms such as "mount," "connected," "connection" should be understood broadly, which, for example, may refer to a secured connection, a detachable connection, or an integral connection; which may be a mechanical connection or an electrical connection; which may be a direct connection or an indirect connection via an intermediate medium; which may also be a communication between the insides of two elements. To people having ordinary skill in the art, specific meanings of the above terms in the present disclosure may be understood based on specific situations.

Although the camera mounting apparatus according to the present disclosure is preferably applied to an airborne oblique photogrammetry technology, the illustration below is only exemplary, not limitative. It is well known that the airborne oblique photogrammetry technology may not only truly reflect ground object conditions, but also may embed accurate geological information through an advanced positioning technology and pick up richer image information so as to provide a better user experience. The airborne oblique photogrammetry technology has a wide array of applications, e.g., national major projection constructions, disaster emergency and disposal, national land reconnaissance, resource exploitation, new rural and small town constructions, urban village resettlement data maintenance; government affairs such as taxation assessment, public security, law enforcement actions, planning, fire; public utility matters such as disaster assessment, environment protection; corporate affairs such as insurance, real estate; and public services such as positioning, Internet applications, tourism, etc. It has a wide market prospect particularly in aspects of fundamental survey, land resource survey and supervision, dynamic supervision on land use, digital city construction, and access to emergency disaster relief mapping data, etc.

The airborne oblique photogrammetry technology involves three parts in hardware: 1) Photography equipment, it includes a nadir-looking camera and an oblique camera, which usually collect data from five orientations, i.e., orthoimage, front view, rear view, left view, and right view. 2) An aircraft: the airborne oblique photogrammetry dominantly adopts fixed wings and rotors, and the fixed-wing unmanned aircraft is mainly powered by electricity and fuel, with advantages such as long endurance and high efficiency. Its disadvantage lies in that because the flying speed of the fixed-wing unmanned aircraft is relatively fast, it is highly demanding on the exposure interval of the equipped camera; secondly, due to the restrictions of safe flight altitude and payload, the ground resolution of the obtained image is always above 8 cm. With the increasingly high requirement on accuracy in the survey industry, the fixed-wing unmanned aircrafts have increasingly lost their consumers. A rotor unmanned aircraft usually has third, fourth, sixth, and eighth rotors. The rotor unmanned aircraft has advantages such as hovering capability, easy operation, and high safety, which may carry out flight operations at different altitudes dependent on the situations of the survey region, and the ground resolution of the captured images may reach under 1 cm. As to selection of the flight control, dual controllers for aerial survey are mostly selected, because the Airborne photogrammetry is mostly carried out in urban regions, safety is the top priority. A disadvantage is a limited endurance. A typical unmanned aircraft photogrammetry camera weighs 2-5 kg, with an endurance of about 30 minutes. 3) Ground station: as to selection of a ground station, the major factors to consider are standby time and high luminance presentation of the screen.

The present disclosure focuses on a camera mounting apparatus that is simple in structure, light-weighted in material, and vibration-resistance, and preferably a multi-rotor airborne oblique photogrammetric system, which not only enables of angle adjustment of oblique photogrammetry based on different altitudes, but also may conveniently scale the number of oblique cameras. Hereinafter, the explanations will focus on relevant structures of the camera mounting apparatus, while other parts not directly related to the camera mounting apparatus and not affecting understanding of the technical solution of the present disclosure will not be detailed.

FIG. 1 is an overall structural schematic diagram of a camera mounting apparatus for mounting one nadir-looking camera and one oblique camera according to the first embodiment of the present disclosure. As shown in FIG. 1, the camera mounting apparatus 10 according to the first embodiment of the present disclosure includes: an upper parallel hanger plate 11 fixed to an unmanned aircraft chassis through a screw or a rivet, a lower parallel hanger plate 12 with a size substantially identical to the upper parallel hanger plate 11, configured for mounting a nadir-looking camera (an orthoimage camera), a plurality of gimbal damping balls 14 that connect the lower parallel hanger plate 12 in parallel and detachably to the upper hanger plate 11 to play a role of damping, and an oblique hanger plate 13 for mounting an oblique camera, where a length of the oblique hanger plate 13 is about half of that of the upper parallel hanger plate 11 and the lower parallel hanger plate 12. Additionally, the plurality of gimbal damping balls 14 are preferably made of a rubber material, a model and parameter of which may be appropriately selected based on the payload to carry; two ends of the plurality of gimbal damping balls 14 are in a disc shape, where the central portion is a spindle-shaped elastic envelop, two ends of which, under an assembling state, pass through circular holes provided on the upper parallel hanger plate 11 and the lower parallel hanger plate 12 through elastic deformation to cause its neck portion to be tightly clamped in the circular holes; preferably, six of the plurality of gimbal damping balls 14 are equidistantly provided along length directions and width directions of the upper parallel hanger plate 11 and the lower parallel hanger plate 12 as shown in FIG. 1.

The width of the oblique hanger plate 13 is identical to that of the lower parallel hanger plate 12, suitable for assembling self-equipped spring buckle devices. Therefore, the widths of the lower parallel hanger plate 12 and the oblique hanger plate 13 are set based on the self-equipped spring buckle devices. This connection structure is suitable for a light-weighted camera (e.g., under 500 g). Further, to ensure that the camera is reliably fixed to the lower parallel hanger plate 12 and the oblique hanger plate 13, primary and secondary faces of camera bonding straps are further bonded to a bottom portion of the camera and between the lower parallel hanger plate 12 and the oblique hanger plate 13, respectively. Each of the camera bonding straps is also referred to as a Hook & Loop, which is originally a connection accessory often used in clothes, differentiated into a primary side and a secondary side, with one face being fine and soft fibers, i.e., loop, and the other face being relatively hard hooks. For a light-weight camera, such a dual fastening manner may suffice for connection requirements.

Additionally, to avoid the camera from falling from air, a safe rope is additionally provided to the camera to bind the camera to the unmanned aircraft chassis to prevent accident falling.

Further, to adjust the capturing angle of an oblique camera based on different flight altitudes, the oblique hanger plate 13 in the figure needs to be connected to the lower parallel hanger plate 12 in an angle adjustable manner. To achieve this technical effect, as shown in FIG. 1, the camera mounting apparatus 10 according to the present embodiment of the present disclosure further includes: a first fixed bearing 15, a second fixed bearing 16, and a hinged bearing 18, which are made of an aluminum metal material, and an angle adjusting sheet 17 which is made of a carbon fiber material. In the first embodiment of mounting one nadir-looking camera and one oblique camera, a right side of the lower parallel hanger plate 12 is used for connecting the oblique hanger plate 13 to mount the oblique camera, and the mounting manner of the oblique hanger plate 13 makes the optical axis of the oblique camera inclined to the right side, and a left side of the lower parallel hanger plate 12 is used for mounting the nadir-looking camera (orthoimage camera). Further, one end of the oblique hanger plate 13 is rotatably connected to a right-side bottom portion of the lower parallel hanger plate 12 through the hinged bearing 18, the hinged bearing 18 is formed by two sub-bearings of a totally identical shape, one end of each of the two sub-bearings is in a cylindrical shape provided with a threaded hole, the two sub-bearings are rotatably hinged together through bolts fitted with the threaded hole. the other end of each of the two sub-bearings is fixed to rectangular grooves on the oblique hanger plate 13 and the lower parallel hanger plate 12 through bolts. Additionally, the first fixed bearing 15 and the second fixed bearing 16 are likewise fixed to the rectangular grooves on the oblique hanger plate 13 and the lower parallel hanger plate 12 through bolts. Preferably, the bolts are made of light-weighted material such as carbon fiber material so as to reduce the overall weight of the camera mounting apparatus. Further, free ends of the first fixed bearing 15 and the second fixed bearing 16 are provided with screw holes, one end of the angle adjusting sheet 17 is holed to facilitate fixation to the second fixed bearing 16 through a screw, the other end of the angle adjusting sheet 17 is grooved to be likewise connected to the first fixed bearing 15 through a screw hole in a connecting position adjustable manner. With the structure above, the included angle of the oblique hanger plate 13 relative to the lower parallel hanger plate 12 may be adjusted. Of course, the holed end of the angle adjusting sheet 17 is connected to the free end of the first fixed bearing 15, while the grooved end is connected to the free end of the second fixed bearing 16, or the angle adjusting sheet 17 may optionally not be provided with the holed end, but adopt a structure grooved as a whole. Additionally, the rectangular grooves on the lower parallel hanger plate 12 and the oblique hanger plate 13 allow appropriately adjusting the mounting position of the oblique hanger plate 13 relative to the lower parallel hanger plate 12. Additionally, the tilt angle adjusting assembly, which includes the first fixed bearing 15, the second fixed bearing 16, and the hinged bearing 18, is preferably provided in two sets along width directions of the oblique hanger plate 13 and the lower parallel hanger plate 12, so as to ensure a desired strength.

Generally, in the airborne oblique photogrammetric system, an included angle between an optical axis of the nadir-looking camera and an optical axis of the oblique camera is in a range of about 20°~45°, and two grooved ends of the angle adjusting sheet 17 correspond to two ends of the above included angle range. In this embodiment, the included angle adjustment manner is that the tilt angle of the oblique camera is determined in advance after the flight altitude is determined.

Figure 2:
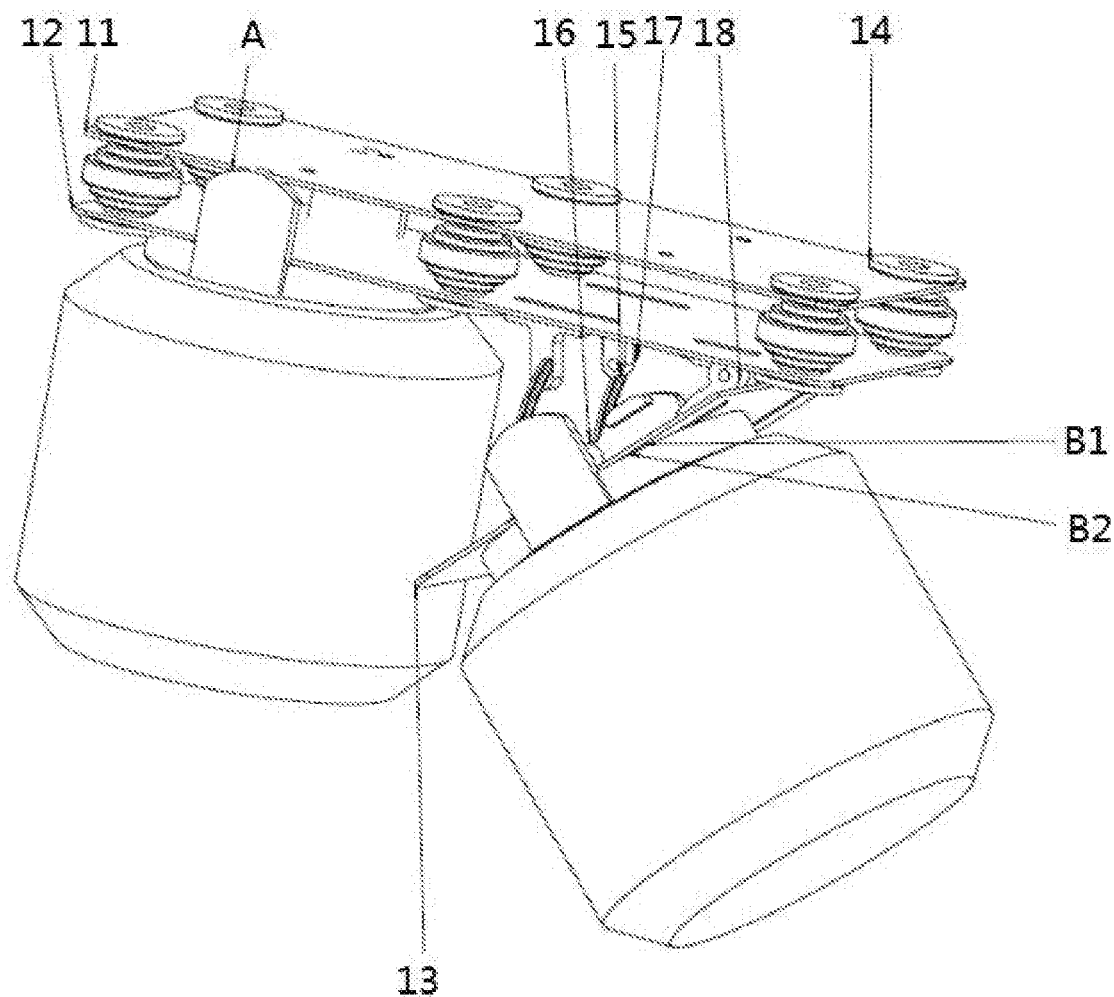
FIG. 2 is a schematic diagram of installing the nadir-looking camera and the oblique camera to the camera mounting apparatus shown in FIG. 1.
Figure 3:
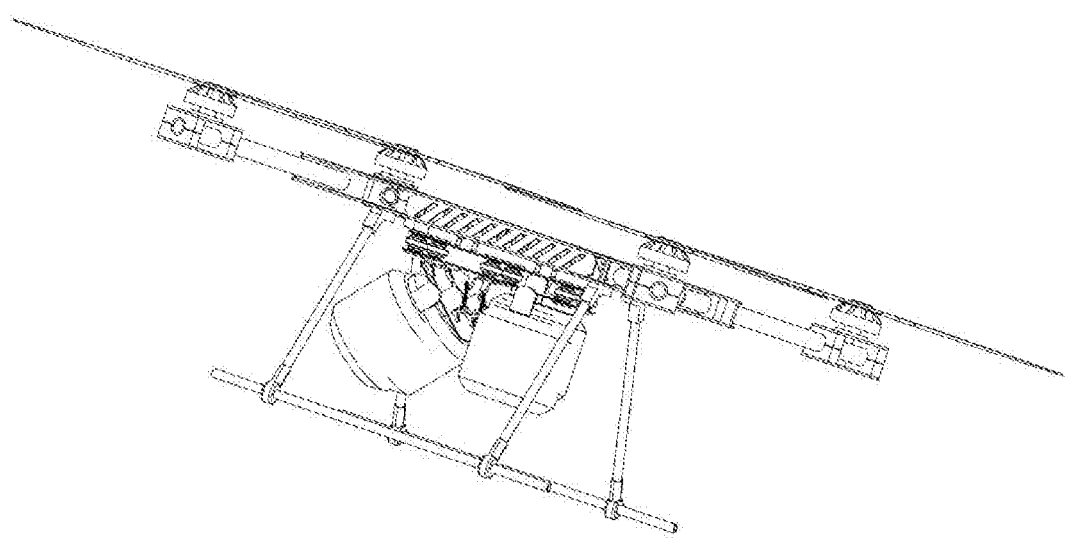
FIG. 3 is a schematic diagram of further installing the camera mounting apparatus, the nadir-looking camera, and the oblique camera shown in FIG. 1 to an unmanned aircraft.

FIG. 2 is a schematic diagram of installing the nadir-looking camera and the oblique camera to the camera mounting apparatus shown in FIG. 1. As shown in FIG. 2, the oblique camera and the nadir-looking camera (orthoimage camera) are tightly clamped onto the oblique hanger plate 13 and the lower parallel hanger plate 12 through the self-equipped spring buckle devices A, respectively, and are further bonded together through the primary and secondary faces B1, B2 of the camera bonding straps. FIG. 3 is a schematic diagram of further installing the camera mounting apparatus, the nadir-looking camera, and the oblique camera shown in FIG. 1 to an unmanned aircraft. It may be seen from FIGS. 2 and 3 that by using the camera mounting apparatus according to a preferred embodiment of the present disclosure, the capturing cameras may be securely to the camera mounting apparatus in a simple structure, and the oblique capturing angle of the airborne oblique photogrammetric system may be adjusted as needed.

Figure 4:
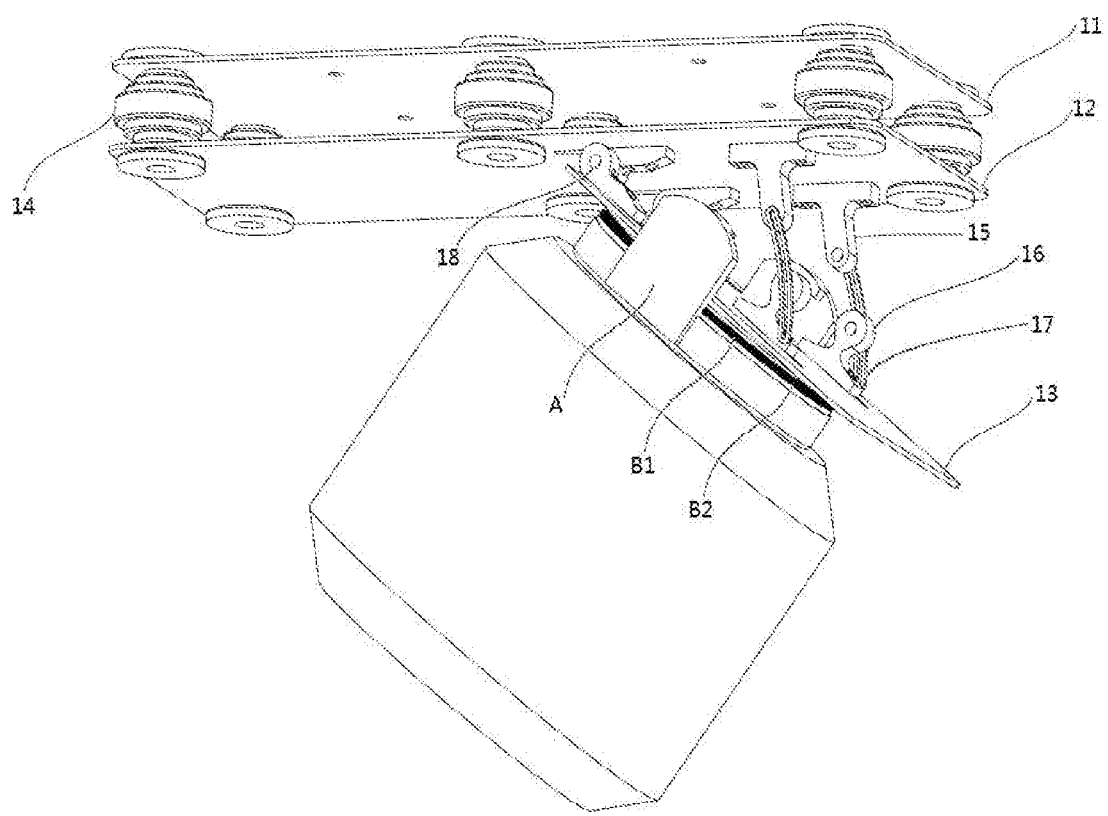
FIG. 4 is a stereoscopic structural schematic diagram of a camera mounting apparatus installed with a single oblique camera according to the second embodiment of the present disclosure.

Because the nadir-looking camera (orthoimage camera) is for improving survey precision, in special circumstances (e.g., a lower accuracy requirement), the orthoimage camera may optionally not be mounted; instead, only a single oblique camera is mounted, thereby further reducing the payload of the unmanned aircraft, which is particularly suitable for a light-weighted or mini unmanned aircraft. The camera mounting apparatus according to the present disclosure may easily deal with such special circumstances. FIG. 4 is a stereoscopic structural schematic diagram of the camera mounting apparatus installed with a single oblique camera according to the second embodiment of the present disclosure. As shown in FIG. 4, such a requirement may be satisfied by slightly adapting the mounting manner of the oblique hanger plate 13; respective components and their roles are completely identical to FIG. 1, which will not be detailed here. Additionally, it should be noted that in the circumstance of the camera mounting apparatus shown in FIG. 4, the direction of the optical axis of the mounted oblique camera is just symmetrical to the camera mounting apparatus as shown in FIG. 1. It is seen that the camera mounting apparatus of the present disclosure may deal with different capturing scenarios with the same components and may also reduce the manufacturing costs and facilitate use.

Figure 5A:
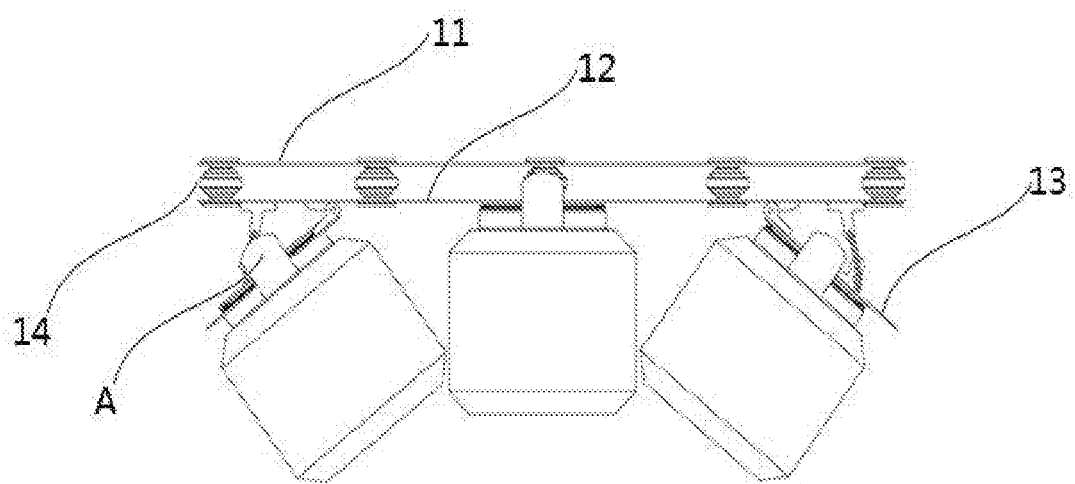
FIG. 5A is a planar structural schematic diagram of a camera mounting apparatus installed with two oblique cameras and one nadir-looking camera according to the third embodiment of the present disclosure.
Figure 5B:
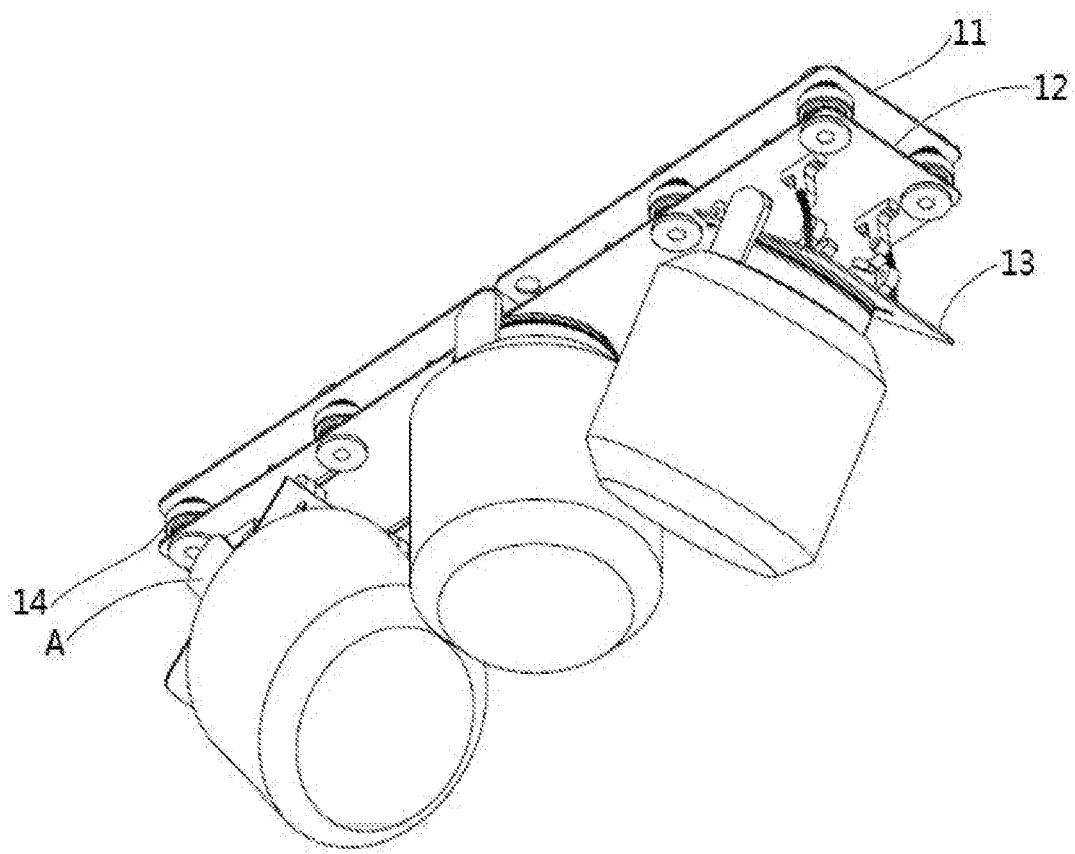
FIG. 5B is a stereoscopic structural schematic diagram corresponding to FIG. 5A.

Based on the first embodiment and the second embodiment, the camera mounting apparatus according to the present disclosure may be easily scaled to mount a greater number of oblique cameras, e.g., 2, 4, or more. Hereinafter, illustration will be made with a scenario of mounting one nadir-looking camera and two oblique cameras as an example. FIG. 5A is a planar structural schematic diagram of a camera mounting apparatus installed with two oblique cameras and one nadir-looking camera according to the third embodiment of the present disclosure; FIG. 5B is a stereoscopic structural schematic diagram corresponding to FIG. 5A.

As shown in FIG. 5, the nadir-looking camera is mounted at a substantively central portion of the lower parallel hanger plate 12, the oblique hanger plate 13 is mounted at two sides of the lower parallel hanger plate 12, and the oblique cameras are mounted on the two oblique hanger plates 13, respectively. The connection manner and angle adjustment manner between the oblique hanger plate 13 and the lower parallel hanger plate 12 are completely identical to the second embodiment, and the respective components as well as their functions are also completely identical to the embodiments above; therefore, reference numerals of relevant parts in the drawings will not be detailed here. Additionally, the connection manner between the nadir-looking camera (orthoimage camera) and the lower parallel camera 12 and the connection manner between the oblique camera and the oblique hanger plate 13 are also completely identical, i.e., dual fastenings through the self-equipped spring buckle devices A and the camera bonding straps B1, B2. It needs to be noted that mounting of a larger number of cameras needs more gimbal damping balls 14 between the upper parallel hanger plate 11 and the lower parallel hanger plate 12, so as to satisfy the requirements on payload.

Figure 6:
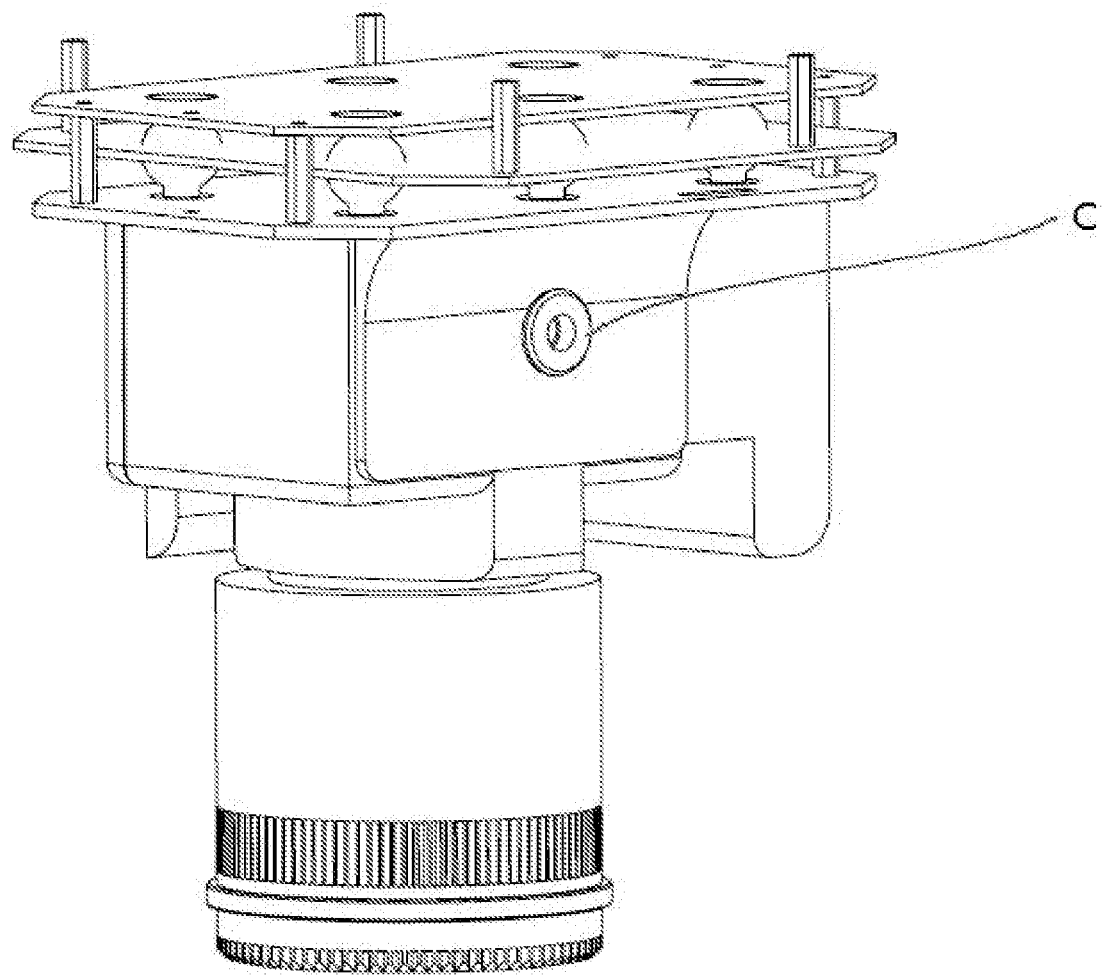
FIG. 6 is a structural schematic diagram of the camera mounting apparatus additionally provided with a side reinforcing plate according to an alternative embodiment of the present disclosure, which is suitable for carrying a relatively heavy camera.

Additionally, the first to third embodiments above are all suitable for mounting light-weighted camera(s) (e.g., under 500 g); in the case of mounting a relatively heavy camera (e.g., a digital single-lens reflex camera DSLR, whose weight may reach 1700 g or so), a thread connection manner is needed for reinforcement. FIG. 6 is a structural schematic diagram of a camera mounting apparatus additionally provided with a side reinforcing plate according to an alternative embodiment of the present disclosure, which is suitable for carrying a relatively heavy camera. As shown in FIG. 6, a hole is drilled in the side reinforcing plate C for securely connecting the relatively heavy camera to a camera hanger through a screw, and meanwhile the camera bonding straps mentioned in the embodiments above may be further used to achieve dual fastening. It needs to be noted that this heavy camera has no self-equipped spring buckle devices, such that the side reinforcing plate C needs to be adopted for connection through a screw. As to the angle adjustment of the oblique cameras, a structure completely identical to the embodiment above may be adopted.

In the embodiments above, circumstances of mounting the single-lens oblique camera, dual-lens (one nadir-looking and one oblique) and triple lens (one nadir-looking+two oblique) have been illustrated. However, those skilled in the art may easily scale to a circumstance of mounting any number of oblique cameras based on the technical solutions of the present disclosure. Besides, not only the size of the included angle between the optical axis of the oblique camera and the optical axis of the nadir-looking camera may be adjusted, the included angle direction between optical axes may also be set arbitrarily. In addition, although the camera mounting apparatus according to the present disclosure is illustrated with the example of application to an airborne oblique photogrammetric system (including fixed-wing aircraft and multi-rotor unmanned aircraft) in the embodiments above, the technical solution of the present disclosure is not limited thereto, which may be easily applied to the oblique photogrammetric system of any type of unmanned aircrafts as needed. Those skilled in the art will easily appreciate that the camera mounting apparatus according to a preferred embodiment of the present disclosure is not limited to be applied to an airborne oblique photogrammetric system, which may be applied to an oblique photogrammetric system of any aircraft, including UAV (Unmanned Aerial Vehicle) or UAS (Unmanned Aircraft System), etc.

What have been disclosed above are only preferred embodiments of the present disclosure, which, of course, cannot serve as a basis for limiting the scope of the present disclosure. Therefore, equivalent changes to the patented scope of the present disclosure still fall within the scope covered by the present disclosure. It should be understood that the descriptions above intend only for illustration, not for limitation. For example, the embodiments (and/or aspects thereof) may be combined in use. In addition, various alterations may be made based on the teachings of the present disclosure so as to be adapted to specific circumstances or materials without departing from the scope of the present disclosure. Through reading the descriptions above, many other embodiments and alternations within the scope and spirit of the claims are obvious to those skilled in the art.

What is claimed is:

1. A camera mounting apparatus for an oblique photogrammetric system, comprising: at least one oblique hanger plate for mounting an oblique camera, an upper parallel hanger plate securely connected to an aircraft chassis, a lower parallel hanger plate connected to the upper parallel hanger plate in parallel by a plurality of gimbal damping balls, and a tilt angle adjusting assembly for connecting the oblique hanger plate to the lower parallel hanger plate in an angle-adjustable manner, wherein the tilt angle adjusting assembly further comprises a first fixed bearing secured to the lower parallel hanger plate, a second fixed bearing secured to the oblique hanger plate opposite to the first fixed bearing, a hinged bearing hinging the oblique hanger plate to the lower parallel hanger plate, and an angle adjusting sheet connected between the first fixed bearing and the second fixed bearing.

2. The camera mounting apparatus for the oblique photogrammetric system according to claim 1, wherein one end of the angle adjusting sheet is a holed end and the other end thereof is a grooved end, the holed end and the grooved end of the angle adjusting sheet are connected to free ends of the first fixed bearing and the second fixed bearing through screws, respectively.

3. The camera mounting apparatus for the oblique photogrammetric system according to claim 2, wherein the lower parallel hanger plate is configured for mounting a nadir-looking camera; a plurality of round holes for mounting the plurality of gimbal damping balls are provided in pairs on the upper parallel hanger plate and the lower parallel hanger plate; and rectangular grooves for mounting the first fixed bearing; the second fixed bearing; and the hinged bearing are correspondingly provided on the lower parallel hanger plate and the oblique hanger plate.

4. The camera mounting apparatus for the oblique photogrammetric system according to claim 3; wherein a connection position of the oblique hanger plate relative to the lower parallel hanger plate is adjusted along the rectangular grooves.

5. The camera mounting apparatus for the oblique photogrammetric system according to claim 4; wherein the oblique camera and the nadir-looking camera are securely snap-fitted to the oblique hanger plate and the lower parallel hanger plate through self-equipped spring buckle devices, and camera bonding straps as secondary camera fixations are also bonded to the lower parallel hanger plate and the oblique hanger plate; and each of the camera bonding straps is a Hook & Loop with primary and secondary faces.

6. The camera mounting apparatus for an oblique photogrammetric system according to claim 1, wherein the upper parallel hanger plate; the lower parallel hanger plate; the oblique hanger plate; and the angle adjusting chip are made of carbon fiber materials; and the first fixed bearing; the second fixed bearing; and the hinged bearing are made of aluminum.

7. The camera mounting apparatus for an oblique photogrammetric system according to claim 6; wherein the tilt angle adjusting assembly is provided in two sets along width directions of the oblique hanger plate and the lower parallel hanger plate.

8. The camera mounting apparatus for an oblique photogrammetric system according to claim 7, wherein the tilt angle adjusting assembly adjusts an included angle between an optical axis of the oblique camera and an optical axis of the nadir-looking camera within a range from 20° to 45°.

9. The camera mounting apparatus for the oblique photogrammetric system according to claim 8, wherein a side reinforcing plate for fastening a relatively large camera is integrally provided on the oblique hanger plate and/or the lower parallel hanger plate; and the side reinforcing plate fastens the relatively large camera through a screw.

10. An airborne oblique photogrammetric system for an aircraft, comprising: the camera mounting apparatus for the oblique photogrammetric system according to claim 1, wherein the aircraft is fixed-wing unmanned aircraft or a multi-rotor unmanned aircraft.

\* \* \* \* \*